June 12, 1928.

P. L. VINSON 1,673,429

SUN RAY HEATER

Filed Aug. 20, 1927

INVENTOR.
P. L. Vinson.
BY Watson E. Coleman.
ATTORNEY.

Patented June 12, 1928.

1,673,429

UNITED STATES PATENT OFFICE.

PAUL L. VINSON, OF SEBRING, FLORIDA.

SUN-RAY HEATER.

Application filed August 20, 1927. Serial No. 214,386.

This invention relates to sun ray solar heaters and more particularly to a stationary form of this device employed in heating water.

An important object of the invention is to improve the structure of the heater as usually manufactured to render the same more efficient and rapid in its action.

A further object of the invention is to provide a device of this character which may be readily and cheaply produced and which will be durable and efficient in service.

These and other objects I attain by the construction shown in the accompanying drawings, wherein for the purpose of illustration is shown a preferred embodiment of my invention and wherein:—

Figure 1:
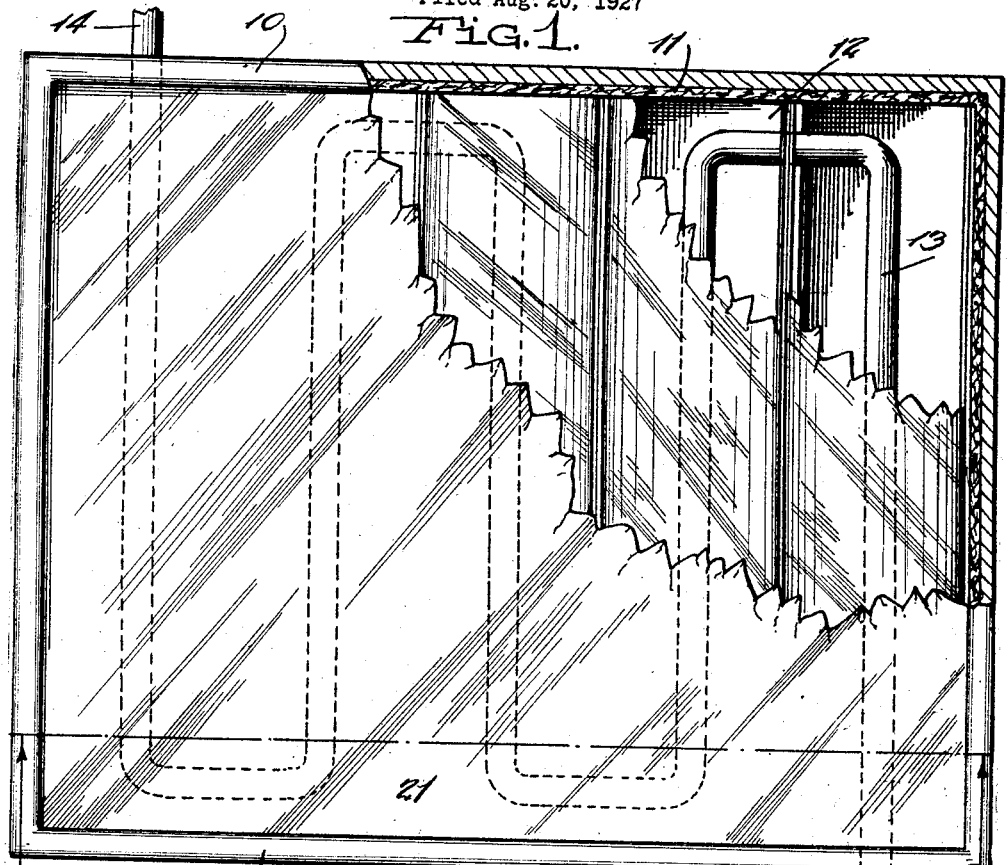
Figure 1 is a plan view of a solar heater constructed in accordance with my invention, portions being broken away to show the interior construction.
Figure 2:
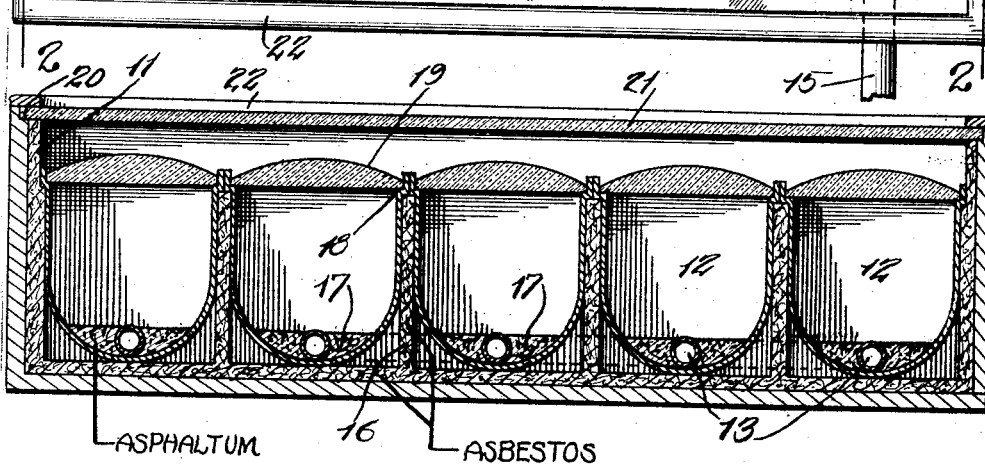
Figure 2 is a section on the line 2—2 of Figure 1.

Referring now more particularly to the drawing, the numeral 10 generally designates an open-topped box-like casing provided interiorly with insulating lining 11. Arranged interiorly of the lining upon the bottom of the box are a plurality of troughs 12 U-shaped in cross section, which extend from end to end of the casing and have each arranged therein a run 13 of a pipe coil, the inlet and outlet ends 14 and 15 of which are extended through the ends of the casing. Between adjacent walls of the U-shaped troughs an insulating medium 16 is preferably disposed and within each trough in the bottom thereof, is arranged a layer of asphaltum, indicated at 17, of such depth that only the upper surfaces of the coil runs 13 are exposed. The upper ends of the arms or walls of the trough are offset outwardly, as indicated at 18, thus producing at the upper ends of these arms shoulders receiving the side edges of a lens strip 19 which is of the same length as the trough and so constructed that it will focus sun rays impinging thereon upon the exposed surfaces of the pipe run 13 contained in the trough.

The upper edges of the casing wall are preferably rabbeted, as indicated at 20, to receive the edge of a glass pane 21 which is retained in position by a molding strip 22.

It will be obvious that with a heater of this construction, the sun rays entering the container will be focused upon the pipe runs, so that they will be subjected to an intense heat. The asphaltum surrounding the pipe, because of its heat absorbing qualities, tends to retain the heat and prevent dispersal thereof before it has had a chance to act upon the fluid contents of the pipe.

As the construction hereinbefore set forth is capable of a certain range of change and modification without materially departing from the spirit of the invention, I do not limit myself to such specific structure except as hereinafter claimed.

I claim:—

A solar heater comprising an open-topped box-like casing having an interior insulating lining, a pipe coil arranged within the casing and including parallel runs, a trough receiving each run of the pipe coil, said troughs being U-shaped in cross section and having the upper ends of the arms thereof offset outwardly, the offset portions of the troughs abutting one another and a lens seated upon the shoulders formed by off-setting the arms of each trough and focused upon the run contained in the trough and heat insulating partitions between the troughs beneath the offset portions thereof.

In testimony whereof I hereunto affix my signature.

PAUL L. VINSON.